(12) United States Patent
Wilenski et al.

(10) Patent No.: US 11,440,261 B2
(45) Date of Patent: Sep. 13, 2022

(54) SYSTEMS AND METHODS FOR THERMAL CONTROL OF ADDITIVE MANUFACTURING

(71) Applicant: The Boeing Company, Chicago, IL (US)

(72) Inventors: Mark Stewart Wilenski, Mercer Island, WA (US); Faraón Torres, Seattle, WA (US); Nick Shadbeh Evans, Lynnwood, WA (US); Samuel F. Harrison, Bothell, WA (US); Michael Patrick Kozar, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 504 days.

(21) Appl. No.: 15/346,537

(22) Filed: Nov. 8, 2016

(65) Prior Publication Data
US 2018/0126671 A1 May 10, 2018

(51) Int. Cl.
*B29C 67/00* (2017.01)
*B29C 64/393* (2017.01)
(Continued)

(52) U.S. Cl.
CPC ............ *B29C 64/393* (2017.08); *B22F 10/20* (2021.01); *B22F 10/30* (2021.01); *B29C 64/153* (2017.08);
(Continued)

(58) Field of Classification Search
CPC ......... B33Y 10/00; B33Y 30/00; B33Y 50/00; B33Y 50/02
See application file for complete search history.

(56) References Cited

U.S. PATENT DOCUMENTS

| 3,600,272 A | 8/1971 | Cortigene et al. |
| 3,813,976 A | 6/1974 | Greer |

(Continued)

FOREIGN PATENT DOCUMENTS

| CN | 103817937 | 5/2014 |
| CN | 105209240 | 12/2015 |

(Continued)

OTHER PUBLICATIONS

U.S. Appl. No. 14/841,423, filed Aug. 31, 2015, Evans et al..
(Continued)

*Primary Examiner* — Ryan M Ochylski
(74) *Attorney, Agent, or Firm* — Dascenzo Gates Intellectual Property Law, P.C.

(57) ABSTRACT

Systems for thermal control of additive manufacturing comprise a build volume within which a part is additively manufactured; a heat source positioned relative to the build volume and configured to actively deliver heat to discrete sections of the part as it is being additively manufactured; and a controller operatively coupled to the heat source and configured to direct delivery of heat from the heat source to discrete sections of the part as it is being additively manufactured to impart desired physical properties to the part. Methods of additively manufacturing a part comprise additively building a part from a feedstock material; and actively heating discrete sections of the part as the part is being additively built to impart desired physical properties to the part.

29 Claims, 1 Drawing Sheet

(51) Int. Cl.
　　　*B29C 64/364*　　　(2017.01)
　　　*B29C 64/20*　　　(2017.01)
　　　*B29C 64/153*　　　(2017.01)
　　　*B29C 64/386*　　　(2017.01)
　　　*B22F 10/20*　　　(2021.01)
　　　*B33Y 30/00*　　　(2015.01)
　　　*B33Y 50/02*　　　(2015.01)
　　　*B22F 10/30*　　　(2021.01)

(52) U.S. Cl.
　　　CPC ............ *B29C 64/20* (2017.08); *B29C 64/364* (2017.08); *B29C 64/386* (2017.08); *B33Y 30/00* (2014.12); *B33Y 50/02* (2014.12); *Y02P 10/25* (2015.11)

(56) References Cited

U.S. PATENT DOCUMENTS

| | | | |
|---|---|---|---|
| 4,154,634 A | 5/1979 | Shobert et al. | |
| 4,378,343 A | 3/1983 | Sugiura et al. | |
| 4,435,246 A | 3/1984 | Green | |
| 4,929,402 A | 5/1990 | Hull | |
| 4,943,472 A | 7/1990 | Dyksterhouse et al. | |
| 5,164,569 A | 7/1992 | Masters | |
| 5,204,124 A | 4/1993 | Secretan et al. | |
| 5,294,461 A | 3/1994 | Ishida | |
| 5,340,433 A | 8/1994 | Crump | |
| 5,398,193 A | 3/1995 | deAngelis | |
| 5,495,328 A | 2/1996 | Spence et al. | |
| 5,503,785 A | 4/1996 | Crump et al. | |
| 5,876,550 A * | 3/1999 | Feygin ............... G05B 19/4099 | 264/405 |
| 5,936,861 A | 8/1999 | Jang et al. | |
| 6,129,872 A | 10/2000 | Jang | |
| 6,149,856 A | 11/2000 | Zemel et al. | |
| 6,214,279 B1 | 4/2001 | Yang et al. | |
| 6,395,210 B1 | 5/2002 | Head et al. | |
| 6,495,091 B1 | 12/2002 | Manson et al. | |
| 6,537,052 B1 | 3/2003 | Adler | |
| 6,722,872 B1 | 4/2004 | Swanson et al. | |
| 7,114,943 B1 | 10/2006 | Fong et al. | |
| 7,232,850 B2 | 6/2007 | Johnson et al. | |
| 7,521,105 B2 | 4/2009 | Bech et al. | |
| 8,133,537 B2 | 3/2012 | Nair et al. | |
| 8,801,990 B2 | 8/2014 | Mikulak et al. | |
| 8,920,697 B2 | 12/2014 | Mikulak et al. | |
| 9,126,367 B1 | 9/2015 | Mark et al. | |
| 9,149,989 B2 | 10/2015 | Uckelmann | |
| 9,186,848 B2 | 11/2015 | Mark et al. | |
| 9,770,876 B2 | 9/2017 | Farmer et al. | |
| 9,908,145 B2 | 3/2018 | Farmer et al. | |
| 10,016,942 B2 | 7/2018 | Mark et al. | |
| 10,076,875 B2 | 9/2018 | Mark et al. | |
| 10,099,427 B2 | 10/2018 | Mark et al. | |
| 2001/0048184 A1* | 12/2001 | Ueno .................... B33Y 50/02 | 264/401 |
| 2002/0017743 A1 | 2/2002 | Priedeman, Jr. | |
| 2003/0044593 A1 | 3/2003 | Vaidyanathan et al. | |
| 2004/0119188 A1 | 6/2004 | Lowe | |
| 2005/0023719 A1 | 2/2005 | Nielsen et al. | |
| 2005/0038222 A1 | 2/2005 | Joshi et al. | |
| 2005/0093208 A1 | 5/2005 | Boyd et al. | |
| 2005/0104241 A1 | 5/2005 | Kritchman et al. | |
| 2005/0116391 A1 | 6/2005 | Lindemann et al. | |
| 2005/0248065 A1 | 11/2005 | Owada | |
| 2006/0048881 A1 | 3/2006 | Evans et al. | |
| 2007/0029030 A1 | 2/2007 | McCowin | |
| 2008/0157437 A1 | 7/2008 | Nelson et al. | |
| 2008/0213419 A1 | 9/2008 | Skubic et al. | |
| 2008/0257879 A1* | 10/2008 | Huskamp ............ B33Y 40/00 | 219/494 |
| 2008/0315462 A1 | 12/2008 | Batzinger et al. | |
| 2009/0095410 A1 | 4/2009 | Oldani | |
| 2009/0130449 A1 | 5/2009 | El-Siblani | |
| 2009/0314391 A1 | 12/2009 | Crump et al. | |
| 2010/0024964 A1 | 2/2010 | Ingram, Jr. et al. | |
| 2010/0084087 A1 | 4/2010 | McCowin et al. | |
| 2010/0190005 A1 | 7/2010 | Nair et al. | |
| 2011/0147993 A1 | 6/2011 | Eshed et al. | |
| 2011/0195237 A1 | 8/2011 | Patel et al. | |
| 2011/0300301 A1 | 12/2011 | Fernando et al. | |
| 2012/0267345 A1 | 10/2012 | Clark et al. | |
| 2014/0061974 A1 | 3/2014 | Tyler | |
| 2014/0086780 A1 | 3/2014 | Miller et al. | |
| 2014/0141166 A1 | 5/2014 | Rodgers | |
| 2014/0154347 A1 | 6/2014 | Dilworth et al. | |
| 2014/0232035 A1 | 8/2014 | Bheda | |
| 2014/0263534 A1 | 9/2014 | Post et al. | |
| 2014/0265000 A1 | 9/2014 | Magnotta et al. | |
| 2014/0265040 A1 | 9/2014 | Batchelder | |
| 2014/0291886 A1 | 10/2014 | Mark et al. | |
| 2014/0328964 A1 | 11/2014 | Mark et al. | |
| 2014/0375794 A1 | 12/2014 | Singh | |
| 2015/0008422 A1 | 1/2015 | Lee et al. | |
| 2015/0037599 A1 | 2/2015 | Blackmore | |
| 2015/0044377 A1 | 2/2015 | Tibor et al. | |
| 2015/0048553 A1 | 2/2015 | Dietrich et al. | |
| 2015/0140230 A1 | 5/2015 | Jones et al. | |
| 2015/0158691 A1 | 6/2015 | Mannella et al. | |
| 2015/0165691 A1 | 6/2015 | Mark et al. | |
| 2015/0174824 A1 | 6/2015 | Gifford et al. | |
| 2015/0217517 A1 | 8/2015 | Karpas et al. | |
| 2015/0239046 A1* | 8/2015 | McMahan .......... B23K 15/0093 | 428/548 |
| 2015/0266243 A1 | 9/2015 | Mark et al. | |
| 2015/0291833 A1 | 10/2015 | Kunc et al. | |
| 2015/0314532 A1 | 11/2015 | Gordon | |
| 2016/0096326 A1* | 4/2016 | Naware ................ B29C 64/106 | 425/143 |
| 2016/0114532 A1 | 4/2016 | Schirtzinger et al. | |
| 2016/0120040 A1 | 4/2016 | Elmieh et al. | |
| 2016/0136897 A1 | 5/2016 | Nielsen-Cole et al. | |
| 2016/0159009 A1 | 6/2016 | Canale | |
| 2016/0207259 A1 | 7/2016 | Fruth | |
| 2016/0230283 A1 | 8/2016 | Tseliakhovich et al. | |
| 2016/0236299 A1 | 8/2016 | Oberhofer | |
| 2016/0271874 A1 | 9/2016 | Tsai et al. | |
| 2016/0303793 A1 | 10/2016 | Ermoshkin et al. | |
| 2016/0311165 A1 | 10/2016 | Mark et al. | |
| 2016/0332363 A1 | 11/2016 | Moore et al. | |
| 2016/0375491 A1* | 12/2016 | Swaminathan ......... B29C 64/20 | 419/53 |
| 2017/0014906 A1* | 1/2017 | Ng ..................... B29C 64/153 | |
| 2017/0072633 A1 | 3/2017 | Hsu | |
| 2017/0087767 A1 | 3/2017 | Grewell | |
| 2017/0129179 A1 | 5/2017 | Mandel et al. | |
| 2017/0129180 A1 | 5/2017 | Coates et al. | |
| 2017/0136545 A1 | 5/2017 | Yoshimura et al. | |
| 2017/0157845 A1 | 6/2017 | Bihari et al. | |
| 2017/0217100 A1 | 8/2017 | Gardiner | |
| 2017/0235294 A1 | 8/2017 | Shapiro et al. | |
| 2017/0341307 A1* | 11/2017 | Vilajosana ......... B29C 35/0288 | |
| 2018/0029296 A1 | 2/2018 | Van Esbroeck et al. | |
| 2018/0072000 A1 | 3/2018 | Riemann | |
| 2018/0117836 A1 | 5/2018 | Reese et al. | |
| 2018/0236714 A1 | 8/2018 | Thelakkadan et al. | |
| 2018/0361660 A1 | 12/2018 | Chen et al. | |
| 2019/0054701 A1 | 2/2019 | Yoshinari | |

FOREIGN PATENT DOCUMENTS

| | | |
|---|---|---|
| CN | 105531062 | 4/2016 |
| DE | 201310103973 | 10/2014 |
| DE | 102015002967 | 10/2016 |
| EP | 1151849 | 11/2001 |
| EP | 1494248 | 1/2005 |
| EP | 2583773 | 4/2013 |
| JP | 02130132 | 5/1990 |
| JP | 2015174284 | 10/2015 |
| WO | WO 01/81031 | 11/2001 |
| WO | WO 2006/020685 | 2/2006 |
| WO | WO 2008/013483 | 1/2008 |
| WO | WO 2012/039956 | 3/2012 |
| WO | WO 2013/086577 | 6/2013 |

(56) References Cited

FOREIGN PATENT DOCUMENTS

| WO | WO 2014/153535 | 9/2014 |
|----|----|----|
| WO | WO 2015/00993 8 | 1/2015 |
| WO | WO2015193819 | 12/2015 |
| WO | WO 2016/053681 | 4/2016 |
| WO | WO 2016053681 | 4/2016 |
| WO | WO 2016125138 | 8/2016 |
| WO | WO 2016139059 | 9/2016 |
| WO | WO2016149181 | 9/2016 |

OTHER PUBLICATIONS

Ogale et al., "Fabrication of Fiber Reinforced Plates with Curvilinear Layout by 3-D Photolithography," 26th International SAMPE Technical Conference, vol. 26, pp. 54-61, Oct. 17-20, 1994.

Ogale et al., "3-Dimensional Composite Photolithography," Proceedings of the American Society for Composites, Eleventh Technical Conference, pp. 822-828, Oct. 7-9, 1996.

Renault et al., "Photo Dynamic Mechanical Analysis for Cure Monitoring of Fiber Reinforced Photoresin Composites," Journal of Advanced Materials, vol. 29, No. 1, pp. 42-47, Oct. 12, 1996.

Gupta et al., "Dual Curing of Carbon Fiber Reinforced Photoresins for Rapid Prototyping," Polymer Composites, vol. 23, No. 6, pp. 1162-1170, Dec. 2002.

Hu et al., "Sensing, Modeling and Control for Laser-Based Additive Manufacturing," International Journal of Machine Tools and Manufacture, No. 43, pp. 51-60, 2003.

U.S. Appl. No. 14/841,470, filed Aug. 31, 2015, Evans et al.

U.S. Appl. No. 14/920,748, filed Oct. 22, 2015, Evans et al.

U.S. Appl. No. 14/931,573, filed Nov. 3, 2015, Evans et al.

Farshidianfar et al., "Real-Time Control of Micro structure in Laser Assitive Manufacturing," International Journal of Advanced Manufacturing Technology (2016), vol. 82, pp. 1173-1186, published online Jul. 1, 2015.

Website screenshots showing "Fiber Composite 3D Printing," from MakeZine.com website, downloaded on Jun. 2, 2015.

User Manual for 3Doodler 2.0, from The3Doodler.com website, downloaded on Aug. 19, 2015.

Printout of online article "Automated Fiber Placement," from AutomatedDynamics.com website, downloaded on Aug. 19, 2015.

Website screenshots showing abstract of Debout et al., "Tool Path Smoothing of a Redundant Machine: Application to Automated Fiber Placement," Computer-Aided Design, vol. 43, Issue 2, pp. 122-132, Feb. 2011, from ScienceDirect.com website, downloaded on Aug. 19, 2015.

Website screenshots showing the Mark One Composite 3D Printer, from MarkForged.com website, downloaded on Aug. 19, 2015.

U.S. Appl. No. 14/995,507, filed Jan. 14, 2016, Evans et al.

U.S. Appl. No. 15/063,400, filed Mar. 7, 2016, Evans et al.

U.S. Appl. No. 15/345,189, filed Nov. 7, 2016, Wilenski, et al.

Printout of online article "Carbon-Fiber Epoxy Honeycombs Mimic the Material Performance of Balsa Wood," Jun. 27, 2014, downloaded from redorbit.com/news/science/1113180114/carbon-fiber-epoxy-honeycombs-mimic-the-material-performance-of-balsa-wood/, Aug. 19, 2015.

Website screenshots showing online article, Krassenstein "Orbital Composites to Make 3D Printing 100 Times Faster Using Carbon Fiber, Fiber Optics, Injection & More," Apr. 28, 2015, from 3DPrint.com website, downloaded on Aug. 19, 2015.

Printout of online article "Carbon3D Introduces Breakthrough CLIP Technology for Layerless 3D Printing, 25-100x Faster," Mar. 17, 2015, from 3Ders.org website, downloaded on Aug. 19, 2015.

Website screenshots showing the Form 1+ SLA 3D Printer, from FormLabs.com website, downloaded on Aug. 20, 2015.

Printout of website showing FormLabs, Frequently Asked Questions (re the Form1+ SLA 3D Printer), from FormLabs.com website, downloaded on Aug. 19, 2015.

Website screenshots of online how-to article, "Fiber Composite 3D Printing (The Bug)," from Instructables.com website, downloaded on Aug. 20, 2015.

Website screenshots of online article, Evan Milberg, "Arevo Labs Introduces First Robot-Based Platform for 3-D Printing Composite Parts," Nov. 23, 2015, from CompositesManufacturingMagazine.com website, downloaded on Jan. 12, 2016.

Printout of online article, Jeff Sloan, "Arevo Labs launches 3D printing platform for composite parts fabrication," Nov. 16, 2015, from CompositesWorld.com website, downloaded on Dec. 9, 2015.

Printout of online article, "Improving Additive Manufacturing (3D Printing) using Infrared Imaging," Aug. 10, 2016, from AZoM.com website, downloaded on Nov. 4, 2016.

Website screenshots showing Stratonics ThermaViz® Sensor Systems, from Stratonics.com website, downloaded on Nov. 4, 2016.

Machine generated English translation of the abstract of JP2015174284, downloaded from Espacenet.com Jun. 12, 2018.

Machine generated English translation of the abstract of DE102015002967, downloaded from Espacenet.com Jun. 12, 2018.

Machine generated English translation of CN 103817937, dated Mar. 26, 2018.

Machine generated English translation of abstract for DE 201310103973 downloaded from Espacenet.com on Nov. 1, 2017.

Machine-generated English translation of JP 02130132, downloaded from Espacenet.com, Mar. 11, 2020.

Machine generated English translation of the abstract of EP 1494248, downloaded from Espacenet.com on Nov. 21, 2018.

European Patent Office, European Examination Report for related European Patent Application No. 17200552, dated Jun. 23, 2020.

China National Intellectual Property Administration, First Notification of Office Action for related Chinese Patent Application No. 201710896196, dated Nov. 23, 2020.

English language translation of China National Intellectual Property Administration, First Notification of Office Action for related Chinese Patent Application No. 201710896196, dated Nov. 23, 2020.

Machine-generated English translation of CN105531062, downloaded from Google Patents on Dec. 22, 2020.

China National Intellectual Property Administration, Office action for related Chinese Patent Application No. 201710896196, dated May 25, 2021.

English language translation of China National Intellectual Property Administration, Office action for related Chinese Patent Application No. 201710896196, dated May 25, 2021.

Machine-generated English language translation of CN 105209240, downloaded Aug. 25, 2021.

\* cited by examiner

SYSTEMS AND METHODS FOR THERMAL CONTROL OF ADDITIVE MANUFACTURING

FIELD

The present disclosure relates to additive manufacturing.

BACKGROUND

Current additive manufacturing techniques often result in distortion of the part being fabricated due to uneven material shrinkage or expansion during fabrication. Such shrinkage or expansion is the result of thermal contraction or expansion of the material upon cooling and/or curing, depending on the material used to fabricate the part. Moreover, such shrinkage or expansion can impact the quality of adhesion between adjacent layers of material. Current systems that attempt to address these issues may use temperature controlled volumes within which the entirety of a part is fabricated or a heated bed upon which the part is fabricated.

SUMMARY

Disclosed systems for thermal control of additive manufacturing comprise a build volume within which a part is additively manufactured, a heat source positioned relative to the build volume, and a controller operatively coupled to the heat source. The heat source is configured to actively deliver heat to discrete sections of the part as the part is being additively manufactured, and the controller is configured to direct delivery of heat from the heat source to discrete sections of the part as the part is being additively manufactured to impart desired physical properties to the part. Some systems further comprise a thermal sensor positioned relative to the build volume and configured to acquire thermal data associated with the part as the part is being additively manufactured. In such systems, the controller is operatively coupled to the thermal sensor and configured to direct delivery of heat from the heat source to discrete sections of the part based at least in part on the thermal data. In some systems, the controller is configured to direct delivery of heat from the heat source to discrete sections of the part based at least in part on predicted thermal characteristics of the part as the part is being additively manufactured.

Disclosed methods for additively manufacturing a part comprise additively building a part from a feedstock material, and actively heating discrete sections of the part as it is being additively built to impart desired physical properties to the part. Some methods further comprise acquiring thermal data associated with the part as the part is being additively built, and in such methods, the actively heating is based at least in part on the thermal data. Some methods further comprise predicting thermal characteristics of the part as the part is being additively built, and in such methods, the actively heating is based at least in part on the thermal characteristics.

DESCRIPTION

Systems and methods for thermal control of additive manufacturing are disclosed herein. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
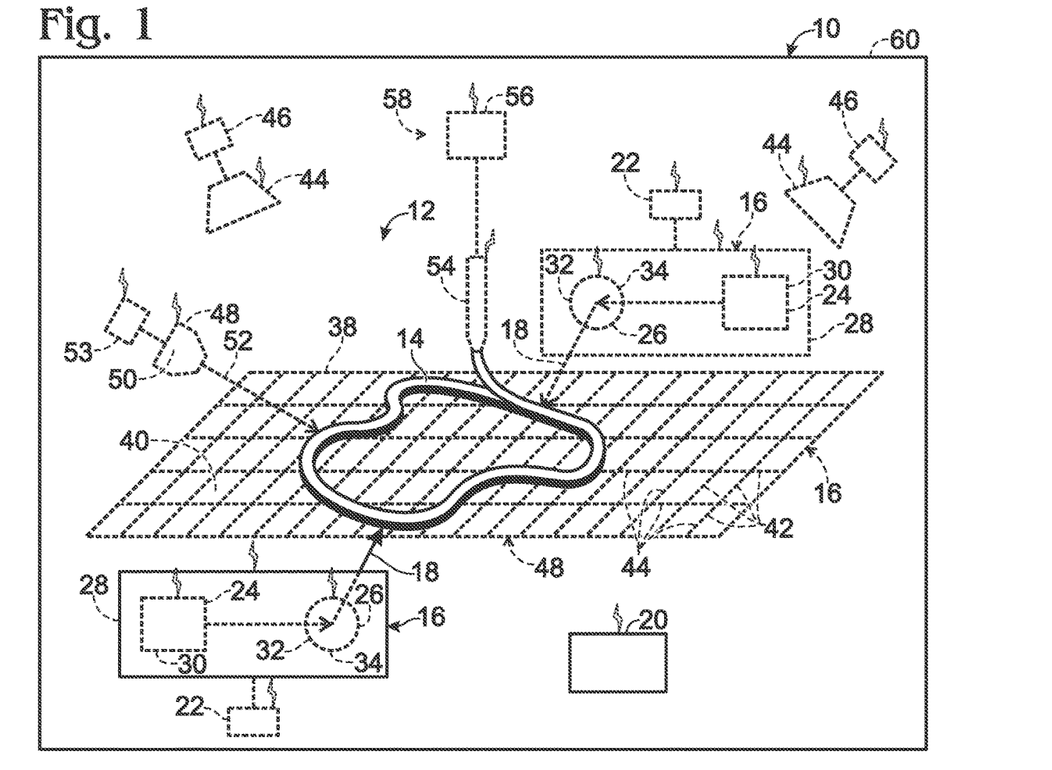
FIG. 1 is a schematic diagram representing systems for thermal control of additive manufacturing.

With reference to FIG. 1, systems 10 for thermal control of additive manufacturing comprise at least a build volume 12 within which a part 14 is additively manufactured, a heat source 16 positioned relative to the build volume 12 and configured to actively deliver heat 18 to discrete sections of the part 14 as the part 14 is being additively manufactured, and a controller 20 operatively coupled to the heat source 16 and configured to direct delivery of heat 18 from the heat source 16 to discrete sections of the part 14 as the part 14 is being additively manufactured.

As used herein, "additive manufacturing" refers to the construction of a part from the bonding together of sub-elements thereof from a feedstock, in which the sub-elements become one to define the whole of the part. Additive manufacturing is distinguished from subtractive manufacturing (e.g., machining), in which material is removed from a volume of material to construct a part. Examples of additive manufacturing include (but are not limited to) three-dimensional (3D) printing technologies, such as extrusion deposition, laser sintering, selective laser sintering, direct laser metal sintering, indirect laser metal sintering, laser melting, electron beam melting, lamination, photopolymerization, stereolithography, power fed directed energy deposition, laser metal deposition-wire, and continuous liquid interface production. Various feedstock materials have been used in additive manufacturing, and any suitable feedstock materials may be used in connection with systems 10, including, for example, feedstocks that include one or more of thermoplastics, thermosets, metal powder, metal fibers, fiber reinforced composite materials, including materials that include fiber tows and/or chopped fiber. Systems 10 are not limited to additive manufacturing with composite materials and any suitable type of additive manufacturing may be used with any suitable feedstock material. "Additive manufacturing" additionally or alternatively may be described as "additive building," and similarly, "additively manufactured" additionally or alternatively may be described as "additively built."

Systems 10 comprise at least one heat source 16, but any suitable number of heat sources 16 may be utilized, with FIG. 1 schematically illustrating three heat sources 16. Heat sources 16 may take any suitable form and configuration, such that they are configured to actively deliver heat 18 to discrete sections of a part 14 as it is being additively manufactured. That is, the heat 18 is purposefully directed at discrete sections of a part 14 to impart desired physical properties to the part 14. More specifically, by being positioned and configured to direct heat 18 to discrete sections of a part 14, it is meant that a heat source 16 is positioned and configured to direct heat to a defined and specific subregion, or location, of a part 14 being additively manufactured, as opposed to an entirety of the part 14 or to a general region or zone of the part 14. Illustrative, non-exclusive examples of such physical properties include (but are not limited to) internal thermal stresses, thermal distortions, metastability, hardness, softness, extent of cure, toughness, ductility, elasticity, metallurgical properties, crystalline structure, grain structure, chemical properties, electrical properties, thermal conductivity, electrical conductivity, resistance to corrosion, magnetic properties, etc.

In some examples, such as when metallic feedstocks are used, the heat 18 may be directed to discrete sections of a part 14 to selectively heat treat the metallic material for desired metallurgical properties within the discrete sections of the part 14. Accordingly, a monolithic part produced from an additive manufacturing process may be produced that has different metallic properties at different locations across the monolithic part, despite the monolithic part being constructed of a material from a single feedstock.

The heat 18 may result in desired internal thermal stresses in a part 14 that otherwise would not be present without the purposeful direction of heat at discrete sections of the part 14. Such internal thermal stresses may be desirable for a variety of reasons, including, for example, to create a metastable part 14, that is, a part 14 with an integral spring-bias with more than one conformation without requiring a distinct spring structure to be operatively coupled to the part 14.

Additionally or alternatively, the heat 18 may be directed to purposefully drive thermal expansion and/or thermal contraction of discrete sections of a part 14 as it is being additively manufactured. For example, during additive manufacturing of a part 14, two adjacent regions of the part 14 may be induced into an interference fit by driving thermal expansion of an inner region relative to an outer region and/or by driving thermal contraction of an outer region relative to an inner region. Alternatively, during additive manufacturing of a part 14, two adjacent regions of the part may be induced into a desired tolerance relative to each other by driving thermal expansion and/or contraction of one or more regions of the part 14.

Additionally or alternatively, the heat 18 may be purposefully directed to facilitate subsequent mechanical work on a part 14. For example, a degree of cures and/or a degree of hardness or softness of a region of a part 14 may be controlled to facilitate subsequent mechanical work on the part 14. In some such examples, it may be desirable to mechanically work on a part 14 to remove material from the part 14 (e.g., via machining). For example, in some applications, it may be desirable to imbed a distinct component in the part 14, such as one or more of a sensor, an electronic device, an actuator, a fastener, circuitry, wiring, tubing, fiber optics, a mechanical linkage, a sub-component, etc. Accordingly, a region of a part 14 may be purposefully formed to facilitate both the removal of material and the insertion of a distinct component. Additionally or alternatively, in some applications, it may be desirable to form a region of the part 14 into a different shape than otherwise produced during the additive manufacturing process, such as to conform to an associated component to be operatively coupled to the part 14. Purposefully creating a region that is softer than adjacent regions and/or purposefully curing a region less than adjacent regions may facilitate such subsequent mechanical working of the part 14.

Additionally or alternatively, the heat 18 may be purposefully directed to actively cure a part 14 as it is being additively manufactured. By actively cure, it is meant that the curing of distinct sections of the part 14 is controlled, as opposed to, for example, placement of the entire part 14 in an oven or autoclave, in which the entirety of the part 14 is subjected to the same heat and pressure.

Additionally or alternatively, the heat 18 may be purposefully directed to restrict thermal distortion of a part 14 as it is being additively manufactured. For example, it may be known that the natural cooling or curing of the material from which a part 14 is additively manufactured may result in undesirable thermal stresses in the part 14, and thus heat 18 may be used to counteract such natural processes that would occur without the heat 18 being actively directed.

In some examples, a heat source 16 is configured to be able to deliver heat 18 to any exposed portion of a part 14 as it is being additively manufactured.

Some systems 10 further comprise a heat source drive assembly 22 that is configured to actively move the heat source 16 in three dimensions relative to the build volume 12. As illustrative, non-exclusive examples, an optional heat source drive assembly 22 may comprise or be one or more of a robotic arm and a drive assembly that facilitates movement of the heat source 16 in multiple degrees of freedom. In some examples, the heat source drive assembly 22 may be configured to move the heat source 16 orthogonally in three dimensions. In some examples, the heat source drive assembly 22 may be configured to move the heat source 16 in three dimensions with at least three degrees of freedom, with at least six degrees of freedom, with at least nine degrees of freedom, or with at least twelve degrees of freedom.

In some examples, a heat source 16 comprises a laser 24, such as (but not limited to) an infrared laser. In some such examples, the heat source 16 further comprises a mirror-positioning system 26 that is configured to actively direct the laser 24 to discrete sections of a part 14 as it is being additively manufactured. In some examples, both a heat source drive assembly 22 and a mirror-positioning system 26 may be provided, in which case the mirror-positioning system 26 may provide for better spatial control of the laser 24 than if solely a heat source drive assembly 22 were provided.

In some examples, a heat source 16 comprises a hot fluid supply 28, and the heat source 16 is configured to direct a stream, or jet, of hot fluid (e.g., gas or liquid) to discrete sections of a part 14 as it is being additively manufactured.

In some examples, a heat source 16 comprises a lamp 30. As illustrative, non-exclusive examples, the lamp 30 may be an infrared lamp or a full-spectrum lamp; however, any suitable wavelength of lamp depending on the application may be used. In some such systems, the heat source 16 further comprises a projector 32 (e.g., a digital light processor (DLP) projector) that is associated with the lamp 30. In such examples, the projector 32 is configured to direct light from the lamp 30 to discrete sections of a part 14 as it is being additively manufactured. Additionally or alternatively, such a projector 32 may be configured to obscure light from the lamp 30 from sections of a part in which the light is not desired to be directed. Additionally or alternatively, the heat source 16 may further comprise a shuttering system 34 that is associated with the lamp 30, and with the shuttering system 34 configured to selectively direct light from the lamp 30 to discrete sections of a part 14 as it is being additively manufactured. Additionally or alternatively, the heat source 16 may be configured to selectively direct heat to discrete sections of a part 14 with pulse width modulation (PWM), by modulating voltage of the heat source 16 (e.g., of a lamp 30), and/or by modulating current of the heat source 16 (e.g., of a laser 24).

Other examples of suitable heat sources 16 include (but are not limited to) those that are configured to deliver one or more of a plasma arc, a flame, an electron beam, and inductive heating. Additionally or alternatively, a heat source 16 may be configured to deliver heat to discrete sections of a part 14 by selectively contacting discrete regions and conducting heat to the discrete regions. In some such examples, a heat source 16 may comprise a probe and/or a clamp, such as that includes a resistive (or other type of) heater.

Some systems 10 further comprise a support bed 38 that is positioned relative to the build volume 12 and configured to support a part 14 as it is being additively manufactured. The support bed 38 has a support surface 40, which may take any suitable form or shape, including being planar or having contoured regions. Support bed 38 additionally or alternatively may be referred to as a mold or as having mold characteristics, such as by defining the contour of portions of a part 14 that are deposited, or otherwise formed, against the support surface 40.

In some examples, a heat source 16 comprises the support bed 38 and/or the support bed 38 comprises a heat source 16, with the support bed 38 being configured to actively deliver heat 18 to discrete sections of a lower surface of a part 14 as it is being additively manufactured. For example, in some such examples, the heat source 16 may further comprise a laser or other system, as discussed, for actively delivering heat 18 to discrete sections of a part 14 that are not physically engaged with the support surface 40 of a support bed 38, and the support bed 38 may actively direct heat 18 to such discrete sections of the part 14 that are physically engaged with the support surface 40.

Additionally or alternatively, in some examples in which a heat source 16 comprises a laser 24 and/or a lamp 30, the support bed 38 may be transparent to light, or at least select wavelengths of light, and the heat source 16 (e.g., the laser 24 and/or the lamp 30) may be configured to actively deliver heat 18 through the support bed 38 to discrete sections of a lower surface of a part 14 as it is being additively manufactured.

In yet further examples in which a heat source 16 comprises a lamp 30, the support bed 38 may be configured to actively mask a lower surface of a part 14 as it is being additively manufactured to actively direct light from the lamp 30 to discrete sections of the lower surface of the part as the part is being additively manufactured. For example, the support bed 38 may comprise a liquid crystal display (LCD).

Additionally or alternatively, in some examples, the support bed 38 comprises embedded heaters 42, for example, in the form of resistive heaters that are arranged in a two-dimensional array or grid, as schematically represented in FIG. 1. Accordingly, the heaters 42 may be selectively activated and deactivated to direct heat 18 at discrete sections of a lower surface of a part 14 as it is being additively manufactured.

As schematically and optionally illustrated in FIG. 1, some systems 10 further comprise one or more thermal sensors 44 that are positioned relative to the build volume 12 and that are configured to acquire thermal data associated with a part 14 as it is being additively manufactured. FIG. 1 schematically and optionally illustrates two thermal sensors 44, but any suitable number of thermal sensors 44 may be provided, including only a single thermal sensor 44 and more than two thermal sensors 44. When one or more thermal sensors 44 are included in a system 10, the controller 20 is operatively coupled to the thermal sensor(s) 44 and is configured to direct delivery of heat 18 from a heat source 16 to discrete sections of a part 14 based at least in part on the thermal data. In other words, the active controlling of the delivery of heat 18 in such examples is based on real-time thermal data acquired via the one or more thermal sensors 44. In some examples, a thermal sensor 44 comprises one or more infrared sensors.

In some examples, the one or more thermal sensors 44 may be stationary relative to the build volume 12, such as with individual thermal sensors 44 having a field of view from a single direction relative to the build volume 12 and thus relative to a part 14 being additively manufactured. Additionally or alternatively, the one or more thermal sensors 44 may be stationary, but the location on the part 14 being sensed may be selectively moved, such as via a mirror-positioning system or other device. In other examples, the system 10 may further comprise a thermal sensor drive assembly 46 that is configured to actively move a thermal sensor 44, or at least the location from which a temperature is sensed by the thermal sensor, in three dimensions relative to the build volume 12. As illustrative, non-exclusive examples, a thermal sensor drive assembly 46 may comprise or be one or more of a robotic arm and a drive assembly that facilitates movement of an associated thermal sensor 44, or portion thereof, in multiple degrees of freedom. In some examples, the thermal sensor drive assembly 46 may be configured to move an associated thermal sensor 44, or portion thereof, orthogonally in three dimensions. In some examples, the thermal sensor drive assembly 46 may be configured to move an associated thermal sensor 44, or portion thereof, in three dimensions with at least three degrees of freedom, with at least six degrees of freedom, with at least nine degrees of freedom, or with at least twelve degrees of freedom.

The thermal data acquired by thermal sensors 44 may comprise or be surface temperatures of a part 14 as it is being additively manufactured. In some such examples, the thermal sensor 44 is configured to acquire the surface temperatures of all exposed surfaces of a part 14 as it is being additively manufactured.

In some examples, the thermal sensor 44 may be described as being a contactless thermal sensor, in that it does not physically contact a part 14 as it is being additively manufactured. Illustrative, non-exclusive examples of such thermal sensors 44 include (but are not limited to) thermal cameras and infrared thermometers. However, other examples of thermal sensors 44 are within the scope of the present disclosure, including, for example, thermal sensors 44 that physically engage a surface to acquire its temperature, such as, for example, thermocouples, temperature transducers, thermistors, and integrated chip (IC) thermometers.

In some examples, an optional support bed 38 may comprise one or more thermal sensors 44.

Additionally or alternatively, in some systems 10, the controller 20 is configured to direct delivery of heat 18 from a heat source 16 to discrete sections of a part 14 based at least in part on predicted thermal characteristics of the part 14 as it is being additively manufactured. Examples of thermal characteristics include temperatures at discrete locations of the part 14, optionally surface temperatures and optionally internal temperatures. The active direction of heat 18 from a heat source 16 controlled by the controller 20 may rely, at least in part, on mathematical calculations that predict thermal characteristics of a part 14 as it is being additively manufactured. For example, the predicted thermal characteristics may be based on one or more of properties associated with a feedstock material used to create a part 14, a timing of creation of discrete sections of a part 14, environmental conditions within the build volume 12, thermal data (optionally incomplete) acquired by an optional thermal sensor 44, and other process parameters such as a temperature associated with a nozzle 54, and the active direction of heat 18 may be based on such predictions to direct one or more of the location of heat, the intensity of heat, the duration of heat, etc.

In some such examples, the controller 20 is not configured to direct delivery of heat 18 from the heat source 16 to discrete sections of a part 14 based on thermal data acquired by a thermal sensor 44 that is positioned relative to the build volume 12. That is, some systems 10 may not include, or may be configured for use without, one or more thermal sensors 44 that acquire thermal data of a part 14 being additively manufactured in real-time, and instead, the control of the heat source 16 may rely exclusively on the predictions of thermal characteristics of a part 14 as it is being additively manufactured. In other examples, however, the controller 20 may be configured to direct delivery of heat 18 based both on predicted thermal characteristics of a part 14 and on acquired thermal data of the part 14. In some such examples, the acquired thermal data may be incomplete or limited, such as with the predicted thermal characteristics effectively accounting for, or filling in, the missing or lack of acquired thermal data for particular sections of a part 14.

As schematically and optionally illustrated in FIG. 1, some systems 10 further comprise a cooling system 48 that is positioned relative to the build volume 12 and that is configured to actively withdraw heat from discrete sections of a part 14 as it is being additively manufactured to impart desired physical properties to the part 14. In such systems 10, the controller 20 is operatively coupled to the cooling system 48 and is configured to direct withdrawal of heat from discrete sections of a part 14 as it is being additively manufactured.

As an example, and as schematically and optionally represented in FIG. 1, the optional cooling system 48 may comprise a supply 50 of pressurized fluid (e.g., gas or liquid), with the cooling system 48 being configured to actively deliver a stream, or Jet, 52 of the Pressurized Fluid to Actively Withdraw Heat from discrete sections of a part 14 as it is being additively manufactured. Examples of suitable fluids include (but are not limited to) refrigerated fluids and cryogenic fluids. Additionally or alternatively, an evaporative cooling fluid stream or mist may be directed to discrete regions of a part 14 by a cooling system 48.

Additionally or alternatively, an optional cooling system 48 may be configured to selectively contact discrete regions of a part 14 to withdraw heat therefrom. In some such examples, the cooling system 48 comprise a probe and/or a clamp, and may be described as a heat sink and/or may include heat sink structures, such as cooling fins and the like.

Some systems 10 further comprise a cooling system drive assembly 53 that is configured to actively move cooling system 48, or at least a portion thereof, such as to actively direct the stream 52 of pressurized fluid in three dimensions relative to the build volume 12. As illustrative, non-exclusive examples, a cooling system drive assembly 53 may comprise or be one or more of a robotic arm and a drive assembly that facilitates movement of the stream 52 in multiple degrees of freedom. In some examples, the cooling system drive assembly 53 may be configured to move the stream 52 in three dimensions with at least three degrees of freedom, with at least six degrees of freedom, with at least nine degrees of freedom, or with at least twelve degrees of freedom.

Additionally or alternatively, in some systems 10, a cooling system 48 may comprise an optional support bed 38 and/or an optional support bed 38 may comprise a cooling system 48. For example, in some such systems 10, the support bed 38 may be configured to actively withdraw heat from a lower surface of a part 14 as it is being additively manufactured. As an illustrative, non-exclusive example, a support bed 38 may comprise cooling coils or lines that carry a fluid flow and that may be selectively controlled by controller 20.

Also within the scope of the present disclosure are systems 10 that include a cooling system 48 but that do not include a heat source 16.

As mentioned, systems 10 may utilize and/or be configured for use with any suitable type of additive manufacturing techniques. In FIG. 1, for illustrative purposes only, system 10 is schematically illustrated as further comprising a nozzle 54 positioned relative to the build volume 12 and that is configured to deliver a material from a feedstock source 56 to the build volume 12 to additively manufacture a part 14. Such a system 10 may be described as comprising a deposition system 58 that is configured to deliver a feedstock material to the build volume 12 to additively manufacture a part 14.

Some systems 10 further comprise an environmental enclosure 60 with at least the build volume 12 being positioned within the environmental enclosure 60. Other components such as the controller 20 may be positioned external of, or at least partially external of, the environmental enclosure, when present. Illustrative, non-exclusive examples of environmental enclosures include (but are not limited to) autoclaves, ovens, pressure chambers, and vacuum chambers.

Also within the scope of the present disclosure are systems 10 that comprise a cooling system 48 but that do not comprise a heat source 16. Some such systems 10 optionally may comprise an environmental enclosure 60 in the form of an oven.

Controller 20 may be any suitable device or devices that are configured to perform the functions of the controller 20 discussed herein. For example, the controller 20 may include one or more of an electronic controller, a dedicated controller, a special-purpose controller, a personal computer, a special-purpose computer, a display device, a logic device, a memory device, and/or a memory device having computer readable media suitable for storing computer-executable instructions for implementing aspects of systems 10 and/or methods disclosed herein.

Additionally or alternatively, the controller 20 may include, or be configured to read, non-transitory computer readable storage, or memory, media suitable for storing computer-executable instructions, or software, for implementing methods or steps of methods according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

In FIG. 1, communication between controller 20 and various component parts of system 10 is schematically represented by lightning bolts. Such communication may be wired and/or wireless in nature.

Figure 2:
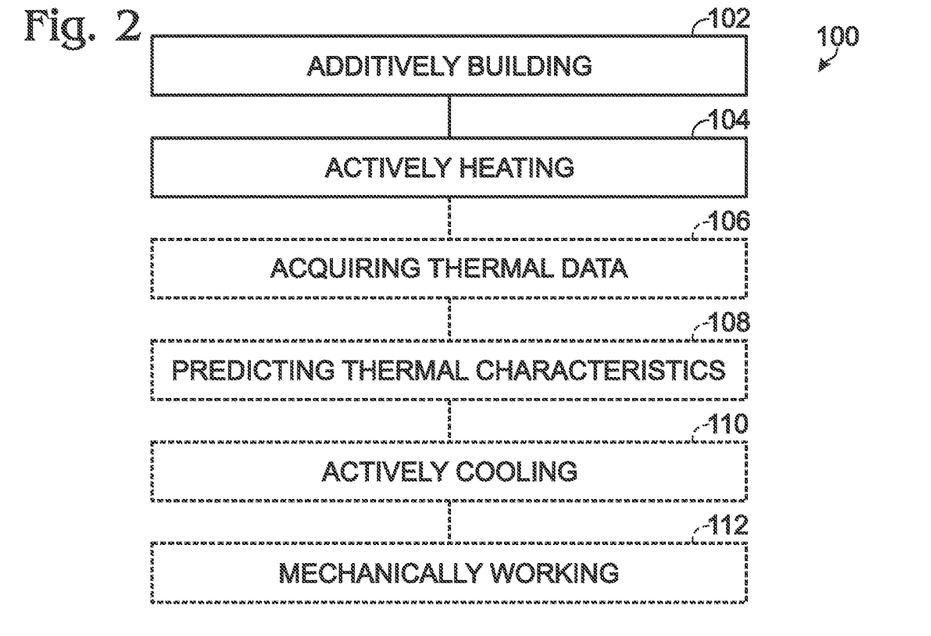
FIG. 2 is a flowchart schematically representing methods for thermal control of additive manufacturing.

Turning now to FIG. 2, methods 100 of additively manufacturing a part are schematically represented. Methods 100 may (but are not required to) be implemented, or performed, by a system 10. Methods 100 comprise at least the steps of additively building 102 a part from a feedstock material and actively heating 104 discrete sections of the part as it is being additively built to impart desired physical properties to the part.

As schematically and optionally indicated in FIG. 2, some methods 100 further comprise acquiring 106 thermal data associated with a part as it is being additively built. In such examples, the actively heating 104 is based at least in part on the thermal data. In some such examples, the thermal data comprises or is surface temperatures of a part as it is being additively built. In some examples, the acquiring 106 comprises acquiring surface temperatures of all exposed surfaces of a part as it is being additively built.

As schematically and optionally indicated in FIG. 2, some methods 100 additionally or alternatively comprise predicting 108 thermal characteristics (e.g., temperatures at discrete locations) of a part as it is being additively built. In such examples, the actively heating 104 is based at least in part on the predicted thermal characteristics, with such thermal characteristics optionally being based on one or more of the feedstock material, a timing of creation of discrete sections of a part, thermal data (optionally incomplete thermal data) acquired by a thermal sensor, and environmental conditions in the vicinity of a part as it is being additively built. In other words, predicting 108 may comprise and/or be based on mathematical calculations that predict thermal characteristics of a part as it is being additively built, and the actively heating 104 may rely on such predictions to direct one or more of the location of heat, the intensity of heat, the duration of heat, etc.

In some such methods 100, the actively heating 104 is not based on acquiring thermal data associated with a part as it is being additively built. In other words, in some methods 100 that comprise predicting 108, the method 100 does not comprise acquiring 106. In other methods 100, the actively heating 104 is based both on acquiring 106 and on predicting 108. For example, the thermal characteristics that are predicted may supplement the acquired thermal data.

As schematically and optionally indicated in FIG. 2, some methods 100 further comprise actively cooling 110 discrete sections of a part as it is being additively built to impart desired physical properties to the part. In some such examples, the actively cooling 110 comprises delivering a stream of pressurized fluid to discrete sections of a part as it is being additively built.

The actively heating 104 may be performed for a variety of reasons and may result in a variety of physical characteristics of a part as it is being additively built. As illustrative, non-exclusive examples, the desired physical properties may comprise one or more of internal thermal stresses, thermal distortions, metastability, hardness, softness, and extent of cure, as generally discussed herein.

In some examples, the actively heating 104 results in a discrete section of a part being configured for subsequent work on the discrete section. In such examples, methods 100 may thus further comprise subsequent to the actively heating 104, mechanically working 112 on the discrete section, as schematically and optionally indicated in FIG. 2. In some such examples, the mechanically working 112 comprises removing material from a part being additively built. In some examples, the mechanically working 112 comprises imbedding a distinct component in a part, such as imbedding one or more of a sensor, an electronic device, an actuator, a fastener, wiring, circuitry, tubing, fiber optics, a mechanical linkage, a sub-component, etc. in the part. In some examples, the mechanically working 112 comprises changing a shape of a region of a part after it is additively built.

In some examples, the actively heating 104 comprises creating an interference fit between adjacent regions of a part as it is being additively built.

In some examples, the actively heating 104 comprises defining desired tolerances between adjacent regions of a part as it is being additively built.

In some examples, the actively heating 104 comprises altering a shape of a part as it is being additively built.

In some examples, the actively heating 104 comprises controlling thermal distortion of a part as it is being additively built. For example, it may be known that the natural cooling or curing of the material from which a part is additively built may result in undesirable thermal stresses in the part, and thus the actively heating 104 may counteract such natural processes that would occur without the actively heating 104.

In some examples, the actively heating 104 comprises controlling curing of a part as it is being additively built. By controlling the curing of a part as it is being additively built, distinct sections of the part may be cured at different and desired rates, as opposed to, for example, curing an entire part within an oven or autoclave, in which the entirety of the part is subjected to the same heat and pressure.

Systems 10 and methods 100 may further include, have, or otherwise be associated with, any other various components, aspects, configurations, characteristics, properties, steps, etc. for additively manufacturing parts. Illustrative, non-exclusive examples of such various optional components, aspects, configurations, characteristics, properties, steps, etc. are disclosed in U.S. patent application Ser. Nos. 14/841,423; 14/841,470; 14/920,748; 14/931,573; 14/995,507; 15/063,400; and 15/345,189 the disclosures of which are incorporated herein by reference.

Illustrative, non-exclusive examples of inventive subject matter according to the present disclosure are described in the following enumerated paragraphs:

A. A system for thermal control of additive manufacturing, the system comprising:

a build volume within which a part is additively manufactured;

a heat source positioned relative to the build volume and configured to actively deliver heat to discrete sections of the part as the part is being additively manufactured; and a controller operatively coupled to the heat source and configured to direct delivery of heat from the heat source to discrete sections of the part as the part is being additively manufactured to impart desired physical properties to the part.

A1. The system of paragraph A, wherein the heat source is configured to be able to deliver heat to any exposed portion of the part as the part is being additively manufactured.

A2. The system of any of paragraphs A-A1, further comprising:

a heat source drive assembly configured to actively move the heat source in three dimensions relative to the build volume.

A3. The system of any of paragraphs A-A2, wherein the heat source comprises a laser.

A3.1. The system of paragraph A3, wherein the heat source further comprises a mirror-positioning system configured to actively direct the laser to discrete sections of the part as the part is being additively manufactured.

A3.2. The system of any of paragraphs A3-A3.1, wherein the laser comprises an infrared laser.

A4. The system of any of paragraphs A-A3.2, wherein the heat source comprises a hot fluid supply.

A5. The system of any of paragraphs A-A4, wherein the heat source comprises a lamp, optionally an infrared lamp.

A5.1. The system of paragraph A5, wherein the heat source further comprises a projector associated with the lamp, wherein the projector is configured to direct light from the lamp to discrete sections of the part as the part is being additively manufactured.

A5.2. The system of paragraph A5, wherein the heat source further comprises a shuttering system associated with the lamp, wherein the shuttering system is configured to selectively direct light from the lamp to discrete sections of the part as the part is being additively manufactured.

A6. The system of any of paragraphs A-A5.2, further comprising:

a support bed positioned relative to the build volume and configured to support the part as the part is being additively manufactured.

A6.1. The system of paragraph A6, wherein the heat source comprises the support bed, and wherein the support bed is configured to actively deliver heat to discrete sections of a lower surface of the part as the part is being additively manufactured.

A6.2. The system of any of paragraphs A6-A6.1 when depending from any of paragraphs A3 and A5, wherein the support bed is transparent to infrared light, and wherein the heat source is configured to actively deliver heat through the support bed to discrete sections of a lower surface of the part as the part is being additively manufactured.

A6.3. The system of any of paragraphs A6-A6.1 when depending from paragraph A5, wherein the support bed is configured to actively mask a lower surface of the part as the part is being additively manufactured to actively direct light from the lamp to discrete sections of the lower surface of the part as the part is being additively manufactured.

A6.4. The system of any of paragraphs A6-A6.3, wherein the support bed comprises embedded heaters.

A6.5. The system of any of paragraphs A6-A6.4, wherein the support bed is configured to actively withdraw heat from discrete sections of a lower surface of the part as the part is being additively manufactured.

A7. The system of any of paragraphs A-A6.5, wherein the heat source comprises two or more heat sources.

A8. The system of any of paragraphs A-A7, further comprising:

a thermal sensor positioned relative to the build volume and configured to acquire thermal data associated with the part as the part is being additively manufactured;

wherein the controller is operatively coupled to the thermal sensor and configured to direct delivery of heat from the heat source to discrete sections of the part based at least in part on the thermal data.

A8.1. The system of paragraph A8, wherein the thermal sensor comprises one or more infrared sensors.

A8.2. The system of any of paragraphs A8-A8.1, wherein the thermal sensor is stationary relative to the build volume.

A8.3. The system of any of paragraphs A8-A8.1, further comprising:

a thermal sensor drive assembly configured to actively move the thermal sensor in three dimensions relative to the build volume.

A8.4. The system of any of paragraphs A8-A8.3, wherein the thermal data comprises, optionally consists of, optionally consists essentially of, surface temperatures of the part as the part is being additively manufactured.

A8.4.1. The system of paragraph A8.4, wherein the the surface temperatures of the part comprise surface temperatures of all exposed surfaces of the part as the part is being additively manufactured.

A8.5. The system of any of paragraphs A8-A8.4.1, wherein the thermal sensor is a contactless thermal sensor that does not physically contact the part as the part is being additively manufactured.

A8.6. The system of any of paragraphs A8-A8.5, wherein the thermal sensor comprises two or more thermal sensors.

A8.7. The system of any of paragraphs A8-A8.6, further comprising:

a mirror-positioning system operatively positioned relative to the thermal sensor and the build volume, wherein the mirror-positioning system is configured to actively move a location on the part being sensed by the thermal sensor.

A9. The system of any of paragraphs A-A8.7, wherein the controller is configured to direct delivery of heat from the heat source to discrete sections of the part based at least in part on predicted thermal characteristics of the part as the part is being additively manufactured.

A9.1. The system of paragraph A9, wherein the predicted thermal characteristics are based on one or more of a feedstock material used to create the part, a timing of creation of discrete sections of the part, environmental conditions within the build volume, and thermal data (optionally incomplete thermal data) acquired by a/the thermal sensor.

A9.2. The system of any of paragraphs A9-A9.1, wherein the controller is not configured to direct delivery of heat from the heat source to discrete sections of the part based on thermal data acquired by a thermal sensor that is positioned relative to the build volume.

A10. The system of any of paragraphs A-A9.2, further comprising:

a cooling system positioned relative to the build volume and configured to actively withdraw heat from discrete sections of the part as the part is being additively manufactured to impart desired physical properties to the part;

wherein the controller is operatively coupled to the cooling system and configured to direct withdrawal of heat from discrete sections of the part as the part is being additively manufactured.

A10.1. The system of paragraph A10, wherein the cooling system comprises a supply of pressurized fluid, and wherein the cooling system is configured to actively delivery a stream of the pressurized fluid to actively withdraw heat from discrete sections of the part as the part is being additively manufactured.

A11. The system of any of paragraphs A-A10.1, further comprising:

a deposition system positioned relative to the build volume, wherein the deposition system is configured to deliver a feedstock material to the build volume to additively manufacture the part.

A12. The system of any of paragraphs A-A11, further comprising:

an environmental enclosure, wherein at least the build volume is positioned within the environmental enclosure.

A13. The system of any of paragraphs A-A12, wherein the system is configured to perform the method of any of paragraphs B-B12.

A14. The system of any of paragraphs A-A13 wherein the desired physical properties comprise one or more of internal thermal stresses, thermal distortions, metastability, hardness, softness, and extent of cure.

A15. The use of the system of any of paragraphs A-A14 to additively manufacture the part.

A16. The use of the system of any of paragraphs A-A14 to additively manufacture the part with desired internal thermal stresses.

A17. The use of the system of any of paragraphs A-A14 to drive thermal expansion and/or contraction of discrete sections of the part as the part is being additively manufactured.

A18. The use of the system of any of paragraphs A-A14 to facilitate subsequent mechanical work on the part.

A19. The use of the system of any of paragraphs A-A14 to actively cure the part as the part is being additively manufactured.

A20. The use of the system of any of paragraphs A-A14 to restrict thermal distortion of the part as the part is being additively manufactured.

A21. The use of the system of any of paragraphs A-A14 to purposefully alter a shape of the part as the part is being additively manufactured.

A22. The use of the system of any of paragraphs A-A14 to additively manufacture the part in an environmental enclosure.

B. A method of additively manufacturing a part, the method comprising:

additively building a part from a feedstock material; and actively heating discrete sections of the part as the part is being additively built to impart desired physical properties to the part.

B1. The method of paragraph B, further comprising:

acquiring thermal data associated with the part as the part is being additively built;

wherein the actively heating is based at least in part on the thermal data.

B1.1. The method of paragraph B1, wherein the thermal data comprises, optionally consists of, optionally consists essentially of, surface temperatures of the part as the part is being additively built.

B1.2. The method of any of paragraphs B1-B1.1, wherein the acquiring comprises acquiring surface temperatures of all exposed surfaces of the part as the part is being additively built.

B2. The method of any of paragraphs B-B1.2, further comprising:

predicting thermal characteristics of the part as the part is being additively built;

wherein the actively heating is based at least in part on the thermal characteristics.

B2.1. The method of paragraph B2, wherein the thermal characteristics are based on one or more of the feedstock material, a timing of creation of discrete sections of the part, thermal data (optionally incomplete thermal data) acquired by a thermal sensor, and environmental conditions in the vicinity of the part as the part is being additively built.

B2.2. The method of any of paragraphs B2-B2.1, the actively heating is not based on acquiring thermal data associated with the part as the part is being additively built.

B3. The method of any of paragraphs B-B2.2, further comprising:

actively cooling discrete sections of the part as the part is being additively built to impart desired physical properties to the part.

B3.1. The method of paragraph B3, wherein the actively cooling comprises delivering a stream of pressurized fluid to discrete sections of the part as the part is being additively built.

B4. The method of any of paragraphs B-B3.1, wherein the desired physical properties comprise one or more of internal thermal stresses, thermal distortions, metastability, hardness, softness, and extent of cure.

B5. The method of any of paragraphs B-B4, wherein the actively heating results in a select discrete section of the part being configured for subsequent work on the select discrete section, and wherein the method further comprises:

subsequent to the actively heating, mechanically working on the select discrete section.

B5.1. The method of paragraph B5, wherein the mechanically working comprises removing material.

B5.2. The method of any of paragraphs B5-B5.1, wherein the mechanically working comprises imbedding a distinct component in the part, optionally wherein the distinct component is one or more of a sensor, an electronic device, an actuator, a fastener, wiring, circuitry, tubing, fiber optics, a mechanical linkage, and a sub-component.

B6. The method of any of paragraphs B-B5.2, wherein the actively heating comprises creating an interference fit between adjacent regions of the part as the part is being additively built.

B7. The method of any of paragraphs B-B6, wherein the actively heating comprises defining desired tolerances between adjacent regions of the part as the part is being additively built.

B8. The method of any of paragraphs B-B7, wherein the actively heating comprises altering a shape of the part as the part is being additively built.

B9. The method of any of paragraphs B-B8, wherein the actively heating comprises controlling thermal distortion of the part as the part is being additively built.

B10. The method of any of paragraphs B-B9, wherein the actively heating comprises controlling curing of the part as the part is being additively built.

B11. The method of any of paragraphs B-B10, wherein the method is performed within an environmental enclosure.

B12. The method of any of paragraphs B-B10, wherein the method is performed by the system of any of paragraphs A-A14.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of systems and apparatuses and steps of methods disclosed herein are not required to all systems, apparatuses, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed system, apparatus, or method. Accordingly, such inventive subject matter is not required to be associated with the specific systems, apparatuses, and methods that are expressly disclosed herein, and such inventive subject matter may find utility in systems, apparatuses, and/or methods that are not expressly disclosed herein.

The invention claimed is:

1. A system for thermal control of additive manufacturing, the system comprising:
   a build volume within which a part is additively manufactured;
   one or more heat sources positioned relative to the build volume and configured to actively deliver heat to discrete sections of the part as the part is being additively manufactured, wherein the one or more heat sources comprise at least a first heat source comprising an infrared laser or an infrared lamp;
   a support bed positioned relative to the build volume and configured to support the part as the part is being additively manufactured, wherein the support bed is transparent to infrared light, and wherein the first heat source is configured to actively deliver infrared light through the support bed to discrete sections of a lower surface of the part as the part is being additively manufactured;
   a thermal sensor positioned relative to the build volume and configured to acquire thermal data associated with the part as the part is being additively manufactured; and
   a controller operatively coupled to the one or more heat sources and the thermal sensor and configured to direct delivery of heat from the one or more heat sources to discrete sections of the part based at least in part on the thermal data as the part is being additively manufactured to impart desired and different physical properties to different regions of the part, wherein the physical properties comprise one or more of internal thermal stresses, thermal distortions, metastability, hardness, and softness.

2. The system of claim 1, wherein the one or more heat sources are configured to be able to deliver heat to any exposed portion of the part as the part is being additively manufactured.

3. The system of claim 1, further comprising:
   a heat source drive assembly configured to actively move at least one of the one or more heat sources in three dimensions relative to the build volume.

4. The system of claim 1, wherein the one or more heat sources comprise a second heat source comprising a laser and a mirror-positioning system configured to actively direct the laser to discrete sections of the part as the part is being additively manufactured.

5. The system of claim 1, wherein the one or more heat sources comprise a second heat source comprising a lamp and a projector associated with the lamp, wherein the projector is configured to direct light from the lamp to discrete sections of the part as the part is being additively manufactured.

6. The system of claim 1, wherein the one or more heat sources comprise a second heat source comprising a lamp and a shuttering system associated with the lamp, wherein the shuttering system is configured to selectively direct light from the lamp to discrete sections of the part as the part is being additively manufactured.

7. The system of claim 1, wherein the first heat source comprises the infrared lamp, and wherein the support bed is configured to actively mask the lower surface of the part as the part is being additively manufactured to actively direct infrared light from the infrared lamp to discrete sections of the lower surface of the part as the part is being additively manufactured.

8. The system of claim 1, wherein the support bed further is configured to actively withdraw heat from discrete sections of the lower surface of the part as the part is being additively manufactured.

9. The system of claim 1, wherein the thermal sensor comprises one or more infrared sensors.

10. The system of claim 1, wherein the thermal sensor is stationary relative to the build volume.

11. The system of claim 1, further comprising:
    a thermal sensor drive assembly configured to actively move the thermal sensor in three dimensions relative to the build volume.

12. The system of claim 1, further comprising:
    a mirror-positioning system operatively positioned relative to the thermal sensor and the build volume, wherein the mirror-positioning system is configured to actively move a location on the part being sensed by the thermal sensor.

13. The system of claim 1, wherein the thermal data comprises surface temperatures of the part as the part is being additively manufactured.

14. The system of claim 13, wherein the surface temperatures of the part comprise surface temperatures of all exposed surfaces of the part as the part is being additively manufactured.

15. The system of claim 1, wherein the thermal sensor is a contactless thermal sensor that does not physically contact the part as the part is being additively manufactured.

16. The system of claim 1, wherein the controller is configured to direct delivery of heat from the one or more heat sources to discrete sections of the part based at least in part on predicted thermal characteristics of the part as the part is being additively manufactured, wherein the predicted thermal characteristics are based on one or more of a feedstock material used to create the part, a timing of creation of discrete sections of the part, the thermal data acquired by the thermal sensor, and environmental conditions within the build volume.

17. The system of claim 1, further comprising:
    a cooling system positioned relative to the build volume and configured to actively withdraw heat from discrete sections of the part as the part is being additively manufactured to impart desired and different physical properties to different regions of the part;
    wherein the controller is operatively coupled to the cooling system and configured to direct withdrawal of heat from discrete sections of the part as the part is being additively manufactured.

18. The system of claim 1, wherein the first heat source comprises the infrared lamp, and wherein the support bed comprises a liquid crystal display configured to actively mask the lower surface of the part as the part is being additively manufactured to actively direct infrared light from the infrared lamp to discrete sections of the lower surface of the part as the part is being additively manufactured.

19. A system for thermal control of additive manufacturing, the system comprising:
    a build volume within which a part is additively manufactured;
    a heat source positioned relative to the build volume and configured to actively deliver heat to discrete sections of the part as the part is being additively manufactured, wherein the heat source comprises an infrared laser or an infrared lamp;
    a support bed positioned relative to the build volume and configured to support the part as the part is being additively manufactured, wherein the support bed is transparent to infrared light, and wherein the heat source is configured to actively deliver infrared light through the support bed to discrete sections of a lower surface of the part as the part is being additively manufactured; and a controller operatively coupled to the heat source and configured to direct delivery of infrared light from the heat source to discrete sections of the lower surface of the part based at least in part on predicted thermal characteristics of the part as the part is being additively manufactured.

20. The system of claim 19, wherein the heat source comprises the infrared lamp, and wherein the support bed comprises a liquid crystal display configured to actively mask the lower surface of the part as the part is being additively manufactured to actively direct infrared light from the infrared lamp to discrete sections of the lower surface of the part as the part is being additively manufactured.

21. The system of claim 19, wherein the support bed comprises a liquid crystal display configured to actively mask the lower surface of the part as the part is being additively built.

22. A method of utilizing the system of claim 19, the method comprising:

additively building the part from a feedstock material within the build volume; and imparting desired and different physical properties to different regions of the part by actively heating, with the heat source, discrete sections of the part as the part is being additively built by actively delivering infrared light through the support bed, wherein the actively heating is computer controlled by the controller.

23. The method of claim 22, further comprising:

acquiring thermal data associated with the part as the part is being additively built, wherein the acquiring is computer controlled;

wherein the actively heating is based at least in part on the thermal data.

24. The method of claim 23, wherein the thermal data comprises surface temperatures of the part as the part is being additively built.

25. The method of claim 23, wherein the acquiring comprises acquiring surface temperatures of all exposed surfaces of the part as the part is being additively built.

26. The method of claim 22, further comprising:

predicting thermal characteristics of the part as the part is being additively built, wherein the predicting is computer controlled;

wherein the actively heating is based at least in part on the thermal characteristics.

27. The method of claim 22, further comprising:

actively cooling discrete sections of the part as the part is being additively built to impart desired and different physical properties to different regions of the part, wherein the actively cooling is computer controlled.

28. The method of claim 22, wherein the physical properties comprise one or more of internal thermal stresses, thermal distortions, metastability, hardness, and softness.

29. The method of claim 22, wherein the actively heating results in a select discrete section of the part being configured for subsequent work on the select discrete section, and wherein the method further comprises:

subsequent to the actively heating, mechanically working on the select discrete section.

\* \* \* \* \*